(12) United States Patent
Maeda

(10) Patent No.: US 6,272,084 B1
(45) Date of Patent: *Aug. 7, 2001

(54) MEMORY CONTROLLER, REPRODUCING APPARATUS MOUNTING THE SAME AND METHOD FOR CONTROLLING THE SAME

(75) Inventor: Yasuaki Maeda, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/870,855

(22) Filed: Jun. 6, 1997

Related U.S. Application Data

(63) Continuation of application No. 08/579,077, filed on Dec. 22, 1995, now abandoned, which is a continuation of application No. 08/143,463, filed on Oct. 26, 1993, now abandoned.

(30) Foreign Application Priority Data

Oct. 31, 1992 (JP) .................................................. 4-316345

(51) Int. Cl.$^7$ .................................................. G11B 7/005
(52) U.S. Cl. .................................. 369/47.34; 369/53.35; 369/59.25
(58) Field of Search ................. 369/47, 54, 59, 369/47.34, 53.35, 59.2, 59.25; 360/53, 54; 364/236.2, 244.4, 262, 262.4, 284.1, 955; 395/403, 404

(56) References Cited

U.S. PATENT DOCUMENTS

| | | | |
|---|---|---|---|
| Re. 31,069 | * 10/1982 | Chang et al. ........................ | 360/53 |
| 4,833,663 | * 5/1989 | Satoh et al. ........................... | 369/59 |
| 4,969,139 | * 11/1990 | Azumatani et al. ................... | 369/54 |
| 5,214,631 | * 5/1993 | Maeda et al. .......................... | 369/59 |
| 5,224,087 | * 6/1993 | Maeda et al. .......................... | 369/47 |
| 5,243,588 | * 9/1993 | Maeda et al. .......................... | 369/54 |
| 5,291,467 | * 3/1994 | Ishiwata et al. ...................... | 369/54 |
| 5,363,362 | 11/1994 | Maeda et al. .......................... | 369/54 |
| 5,438,462 | * 8/1995 | Copolillo ............................. | 360/53 |

FOREIGN PATENT DOCUMENTS

| | | |
|---|---|---|
| 0448378A2 | 9/1991 | (EP) . |
| 0465053 A3 | 1/1992 | (EP) . |
| 0469553 A1 | 2/1992 | (EP) . |
| 0472343 A1 | 2/1992 | (EP) . |
| 0540164 A1 | 5/1993 | (EP) . |
| 0554 858 A2 | 8/1993 | (EP) . |

OTHER PUBLICATIONS

Onodera, "Magnetic Disk Controller", Patent Abstracts of Japan, vol. 15, No. 420, Oct. 1991.*

* cited by examiner

*Primary Examiner*—W. R. Young
(74) *Attorney, Agent, or Firm*—Oblon, Spivak, McClelland, Maier & Neustadt, P.C.

(57) ABSTRACT

A disc reproducing apparatus having a memory for temporary storage of data read from a disc. The memory is under the control of a memory controller which accesses data stored in the memory based on a generated address. The generated address is determined by a mode controller which can specify either the same address location, a previous location, or a later location depending upon the amount of data stored in the memory and errors which may occur in reading data from the disc.

12 Claims, 10 Drawing Sheets

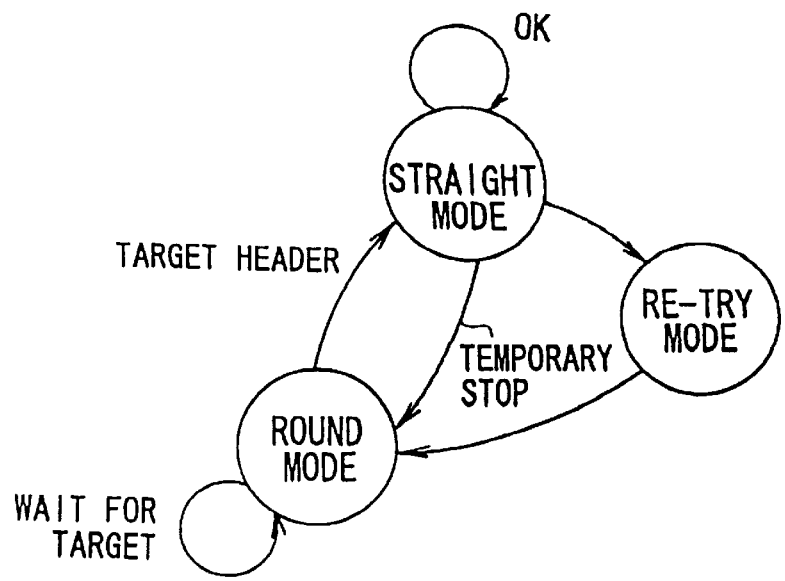
FIG. 11
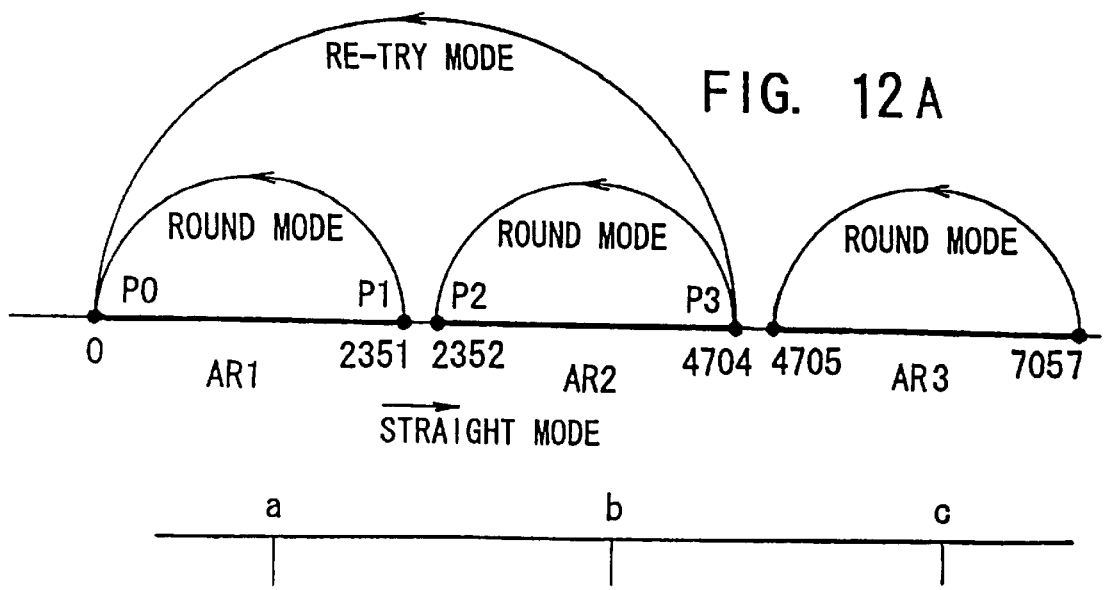
FIG. 12A
FIG. 12B

MEMORY CONTROLLER, REPRODUCING APPARATUS MOUNTING THE SAME AND METHOD FOR CONTROLLING THE SAME

This is a continuation of application Ser. No. 08/579,077 filed on Dec. 22, 1995, now abandoned, which is a continuation of application Ser. No. 08/143,463 filed on Oct. 26, 1993, now abandoned.

BACKGROUND OF THE INVENTION

1. Field of the Invention

This invention relates to a disc reproducing apparatus and more particularly, is suitable for applying to a system in which audio signals recorded on a magneto-optical disc are reproduced.

2. Description of the Related Art

Heretofore, there have been proposed a disc reproducing apparatus which can reproduce the data from both of a magneto-optical disc and an optical disc, and a disc recording/reproducing apparatus which can record a desired information on a magneto-optical disc repeatedly.

Meanwhile, in the case that the disc reproducing apparatus is used for reproducing the audio data recorded on the magneto-optical disc, etc., since it can be considered that the disc reproduction device is often used outdoors which is apt to receive vibration from the outside, a technology is known, for example, in U.S. Pat. No. 5,214,631 to improve the anti-vibration strength by using a semiconductor memory in order not to interrupt a data read and cause tark jump if the large vibration is given to the disc reproducing apparatus.

In this vibration protection technique, the audio data, which is compressed to about ⅕ by a sound compression technique, error correction processed, and recorded, is read out from the magneto-optical disc at the rate of 1.4 [Mbit/s], and the decoded audio data is written in a random access memory (hereinafter, referred to as "RAM") temporarily.

Thereafter, the audio data being compressed is read out from the RAM at the rate of 0.3 [Mbit/s] continuously and is expanded to the former data length, so that the data of specific size is reproduced while it is continuously stored in the RAM. Thus, the anti-vibration strength is improved. That is, during this time, the audio data is read from the magneto-optical disc intermittently.

In this way, by storing the audio data to be actually reproduced in the random access memory to the data several seconds ahead, if the data can not be read out due to a large vibration, the stored data is reproduced until the data read starts again. Therefore, the occurrence of tark jump can be prevented previously.

Meanwhile, the magneto-optical disc used for the reproduction of this audio data is arranged into a data recording area for recording the audio data which divides into specific block units (hereinafter, referred to as a "sound group") for every data unit (hereinafter, referred to as a "cluster"), and a read-in area for recording the table of contents information (TOC data) which includes disc information and track information excluding the music data.

The data recording area among these is allocated in the outside of the recording area, and the read-in area is allocated in the inner periphery of the recording area. The write and read of data to the data recording area is performed at an integer multiple of one cluster.

Here, one cluster is composed of 36 sector data. In the magneto-optical disc for recording, the head three sectors are allocated to a link sector L as a redundant sector, the next one sector to a sub-data S, and the other 32 sectors to compressed data (FIG. 1A).

More specifically, one sector is composed of 12 bytes of a sync area, 4 bytes of a header area, 4 bytes of a sub-header area, and 2332 bytes of a compressed data area. To the header area from the head, 2 bytes for a cluster number, 1 byte for a sector number, and 1 byte for a mode area is respectively allocated (FIGS. 2A and 2B).

To one sector in the compressed data area, 5.5 pairs of sound groups composed of two sectors (even sector, odd sector) and each of sound group composed of two channel data (a left channel data or a right channel data) and 5.5 pairs of sound groups are allocated (FIGS. 1B and 1C).

In this type of disc recording/reproducing apparatus, 1 sound group of the compressed data of 512 samples, i.e., 424 bytes, is handled as one unit (FIG. 1D).

This type of data structure is known, for example, in U.S. pat. application Ser. No. 48359 filed Apr. 15, 1993, now U.S. Pat. No. 5,363,362.

In the disc reproducing device, the audio data read from the magneto optical disc is written in the RAM following the procedure shown in FIGS. 3 and 4.

That is, a micro computer (hereinafter, referred to as "CPU"), which constitutes the system controller of the disc reproduction device, when it enters the audio data read out routine (step SP1), initializes a count value (step SP2) so that the data is read at a predetermined address of the RAM, and then, accesses to a predetermined data area and starts to read out the data (step SP3).

After this, the CPU observes the existence of the sync interrupt (step SP4), and then at the time of interruption, judges whether the mode is the write mode or not (that is, the write mode or the monitor mode) (step SP5).

Next, when the present mode is the monitor mode (that is, the case where a negative result is obtained), the CPU judges whether the sector which is presently read from the header data becomes the sector just before the waiting target sector (step SP6). Then, if it is not the sector just before the target sector, the CPU judges whether the immediately preceding mode is the write mode or not (step SP7), and in the case where it is the write mode, the CPU returns to step SP4 and repeats the above processing.

On the contrary, when the sector just before the target sector is detected, the CPU sets the count value to specify the RAM address, and at the same time, switches the write/monitor mode switching flag WRMN to the "H" level, returns to step SP4, and waits for the input of the target sector (step SP8 and step SP9).

The write/monitor mode switching flag WRMN is the flag which permits the transition to the write mode when the sync with "H" level is inputted. And the write/monitor mode switching flag WRMN is handled as the flag which permits the transition to the monitor mode when the sync with "L" level is inputted.

When the CPU detects the sync interrupt in the state that the target sector is inputted (step SP4 and step SP5), the CPU proceeds to the write mode and starts to write the data in the address and judges whether the write mode is to be terminated after reading out the present sector or not (step SP11).

In the case where the writing of data is to be terminated after reading out the present sector, the write/monitor mode switching flag WRMN is switched to the "L" level (step SP12). However, the CPU generally proceeds to step SP13 directly and judges whether the sync interrupt is just after the transition to the write mode or not.

Here, the CPU proceeds to step SP14 in the case that the interruption is just after the transition to the write mode, and confirms whether the header is correct or not. Then, if the header is correct, the CPU returns to step SP4 and waits for the next sync interrupt.

On the contrary, when the header is not correct, the CPU switches the write/monitor mode flag WRMN to the "L" level, sets the target sector again (step SP15 and step SP16), and returns to SP4 to process again from the monitor of the target sector.

Further, when a negative result is obtained in step SP13 including the case where a positive result is obtained in step SP7, the CPU judges whether or not an error has occurred in the sector data written just before (step SP17).

When an error has occurred, as the same as described above, the CPU switches the write/monitor mode switching flag WRMN to the "L" level, sets the target sector again (step SP19 and step SP20), and returns to step SP4 in order to read out the correct data again.

On the contrary, when an error has not occurred, the CPU judges whether the present mode has already moved to the monitor mode or not. In the case that it is in the monitor mode, the CPU proceeds to step SP22 and terminates the processing, whereas in the case that it is in the write mode, the CPU returns to step SP4 to continue the processing.

In this way, the preceding sector has to be detected to permit the write (step SP6) and three confirmations of whether the target sector is actually read, whether the header is correct (step SP14), and whether the data is written correctly are required for writing the specific sector in the predetermined address of RAM.

However, the judgement process is complicated as described above, and moreover, when an error occurs, the process of setting again the read out of the data into the RAM and the access to the RAM is required in addition to the above three confirmation processing. Therefore, the load for the CPU is large.

SUMMARY OF THE INVENTION

In view of foregoing, an object of this invention is to provide a disc reproducing apparatus which the RAM address management is simple in comparison with the conventional device.

The foregoing object and other objects of the invention have been achieved by the provision of a disc reproducing apparatus having a recording medium 3 in which the data composed of, at least, sync data, header data, and digital data is recorded, and a storage means 10 which sequentially reads from the data of sector unit from a recording medium 3 and which once storages the data, in which the data stored in the storage means 10 is sequentially read for every sector unit and is reproduced, comprises: a recording control means 8 for controlling the write/read of said digital data to said recording means; and a control means 9 for controlling the operation state of said recording control means 8, wherein: said recording control means 8 has address generating parts 27 and 28 for generating an internal address of said storage means 10 according to the external command (R/W control signal) transferred from said control means 9 and/or the data (status) read to said storage means 10. Further, in the present invention, said control means 9 switches to one of the round mode that the internal address of said storage means 10 generated by the address generating part 27 specify the address in the same area repeatedly, the straight mode for specifying the address in the next area after the specification of the address in one area terminates, and the re-try mode for specifying the address in the front area after the specification of address in one area terminates.

Further, in the present invention, said control means 9, in the case where said address generating part 27 is in said straight mode, when the data size stored in said storage means 10 is more than the first predetermined value or said data is not the desired data, switches to said round mode and, in the case where said address generating part 27 is in said round mode, when the data size stored in said storage means 10 is less than the second predetermined value or the desired data is read, switches to said straight mode.

Furthermore, said control means 9, in the case where said address generating part 27 is in said straight mode, when it is detected that an error is contained in the data read in said storage means 10, switches to said re-try mode.

Address generating parts 27 and 28, which generate the internal address of a storage means 10 according to the external command (R/W control signal) outputted from a control means 9 and/or the data (status) read into the storage means 10 are provided to the store control means 8 controlling the write/read of the digital data to the storage means 10. The address generating parts 27 and 28 control the write/read of the data to the storage means 10 based on the generated address. This simplifies the specification of address, and complicated control becomes needless.

According to this invention, an address generating part is provided in a storage control means for controlling the write/read of the digital data to a storage means, in order that the internal address in the storage means is generated according to the external command transferred from a control means and/or the data read to the storage means. Therefore, the necessary confirmation for writing the data becomes once for each sector, and this simplifies the specification of address in comparison with the conventional processing so as to reduce a load of the control circuit.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 11 is a schematic view showing the state transition of the write mode; and

FIGS. 12A and 12B are schematic views for the explanation of the address specified at that time;

DETAILED DESCRIPTION OF THE EMBODIMENT

Figure 5:
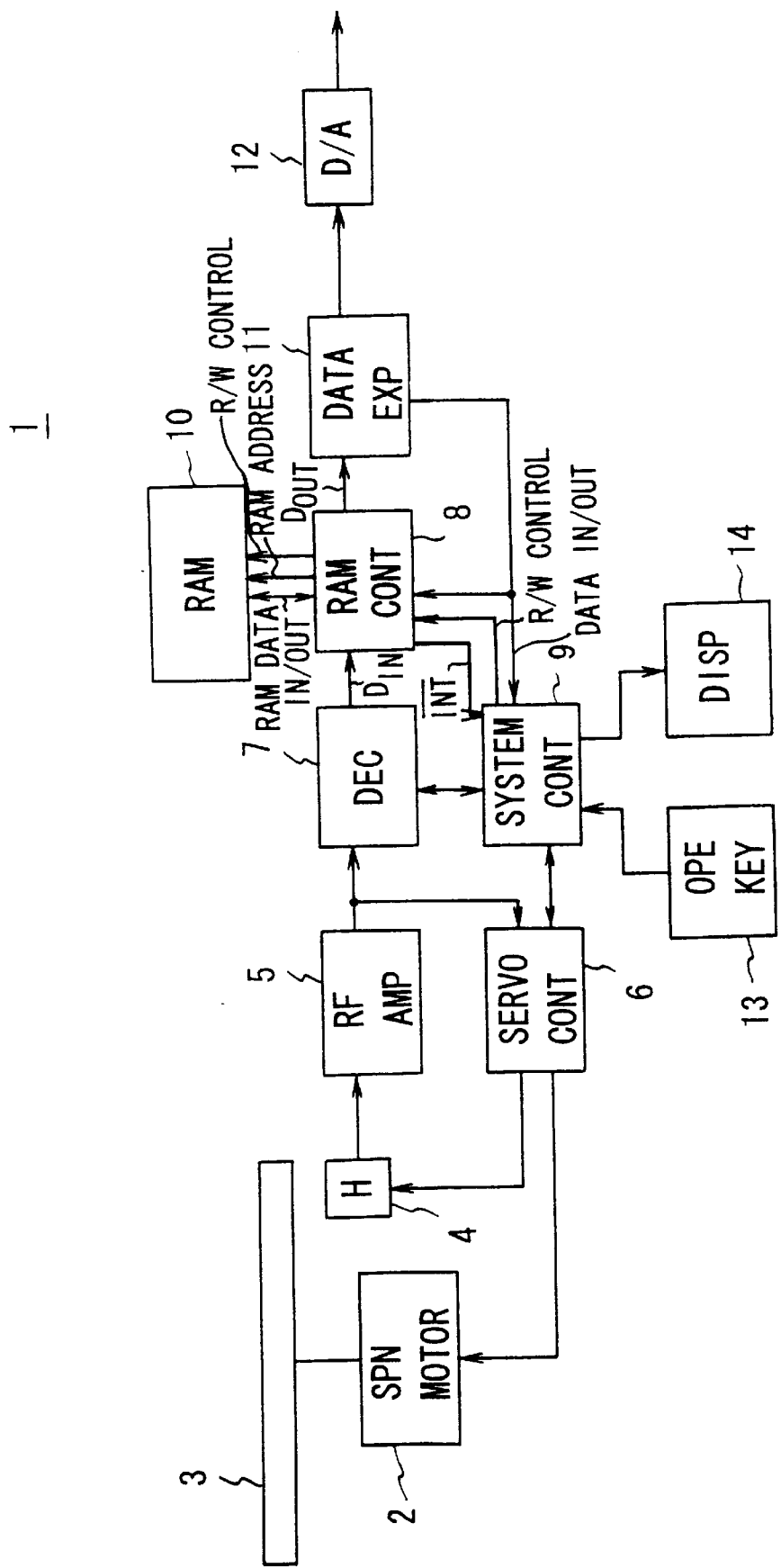
FIG. 5 is a block diagram showing the embodiment of the disc reproducing apparatus according to this invention.

Preferred embodiments of this invention will be described with reference to the accompanying drawings:

In FIG. 5, 1 indicates a disc recording/reproducing apparatus for recording the data by magnetic field modulation as a whole. A light beam is emitted from an optical pick up 4 to a magneto optical disc 3 rotated by a spindle motor 2, and the reproduction signal which is the received light output of the reflected light is amplified at a radio frequency amplifier circuit 5.

The disc reproducing apparatus 1 supplies the amplified reproducing signals to a servo control circuit 6, and a decoder 7. The servo control circuit 6 controls the revolution speed of the spindle motor 2 based on the reproducing signals, and controls the tracking and focusing, etc. of the optical pick up 4.

On the contrary, the decoder 7 demodulates the reproducing signals into 2 value data, decode processes the signal of EFM (eight-fourteen modulation) and error correct processes them, and supplies the corrected reproducing data to the RAM control circuit 8.

The RAM control circuit 8 sequentially transmits the reproducing data to a predetermined address of the RAM 10 specified by a system controller 9 consisting of micro computer. Also, the RAM control circuit 8 reads the reproducing data from the predetermined address of the RAM 10 specified by the system controller 9, and supplies them to a data expansion circuit 11.

Further, the RAM control circuit 8 extracts the header and the sub-header from the reproducing data supplied to the data expansion circuit 11 to supply them to the system controller 9. Furthermore, the RAM control circuit 8 performs various processings, such as the direct access to the RAM 10 by the system controller 9 and the error correction with the sound group as a unit.

Figure 6:
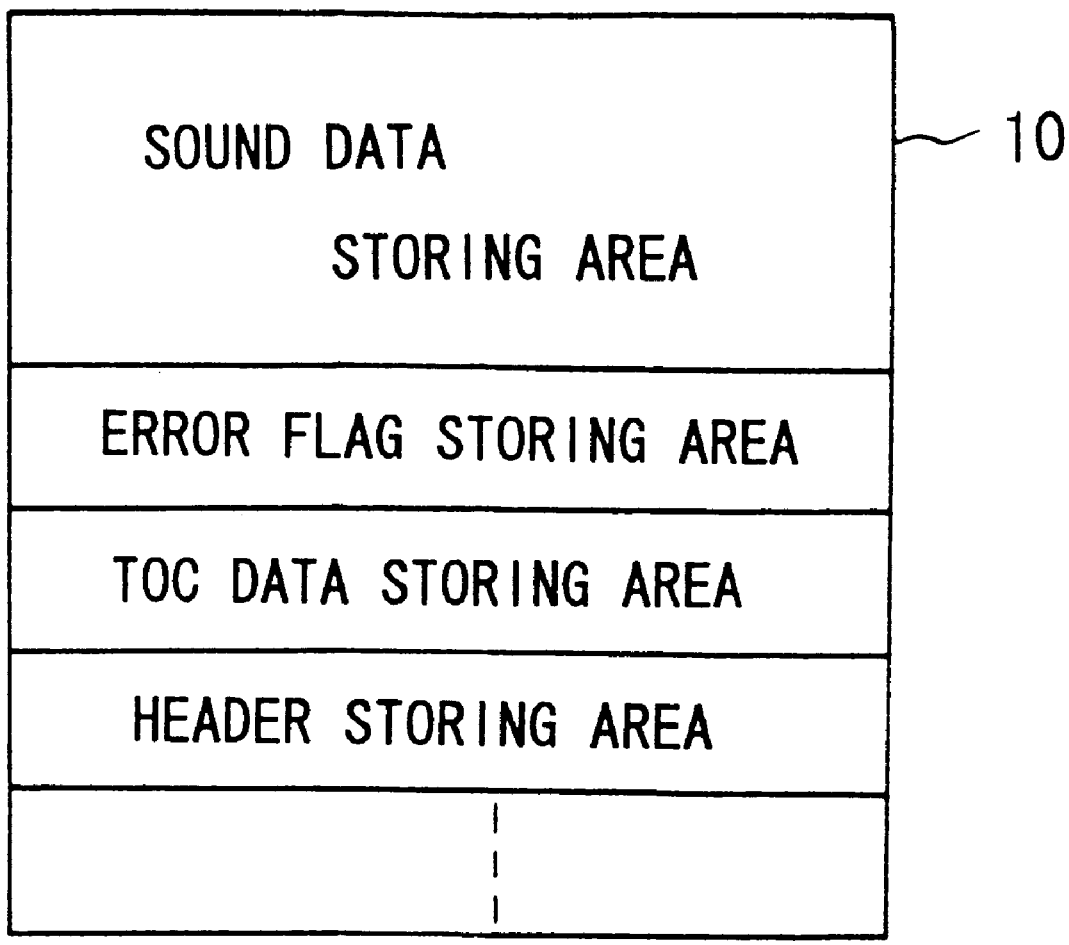
FIG. 6 is a schematic view showing the memory map of data recorded in a random access memory.

In this embodiment, the storage area of the RAM 10 is 1 [Mbit], and the main data of 44 sectors, and the TOC (Table of Contents) data of more than 6 sectors and the error flag are stored separately (FIG. 6).

After the data expansion circuit 11 expansion processes the sound data of 1.4 [Mbit/s] from the reproduction data read out at 0.3 [Mbit/s] at this time, the data expansion circuit 11 supplies them to a digital/analog converting circuit 12 (hereinafter, referred to as "D/A converting circuit 12") to convert them to sound signals.

At this time, the system controller 9 controls the whole operation of the disc reproducing system 1, and also adds the various control data to the header area and sub-header area of each sector consisting the reproducing data.

When the reproducing data is transferred to the RAM 10, the system controller 9 writes the track number in the mode area which is undefined at the time of reading from the magneto optical disc, and adds and writes the error information of the sector and the terminating position of the audio data with the sound group as a unit in the sub-header area (FIG. 6).

In the case where the compressed sound data is read from the RAM 10, the system controller 9 reads the time information and the control information of each sector from the RAM control circuit 8, and displays the reproducing time or the remaining time on a display 14 according to the instruction of a key operation part 13 and controls the state of reproduction.

The explanation of RAM control circuit 8 in FIG. 5 is described below using FIG. 7.

Figure 3:
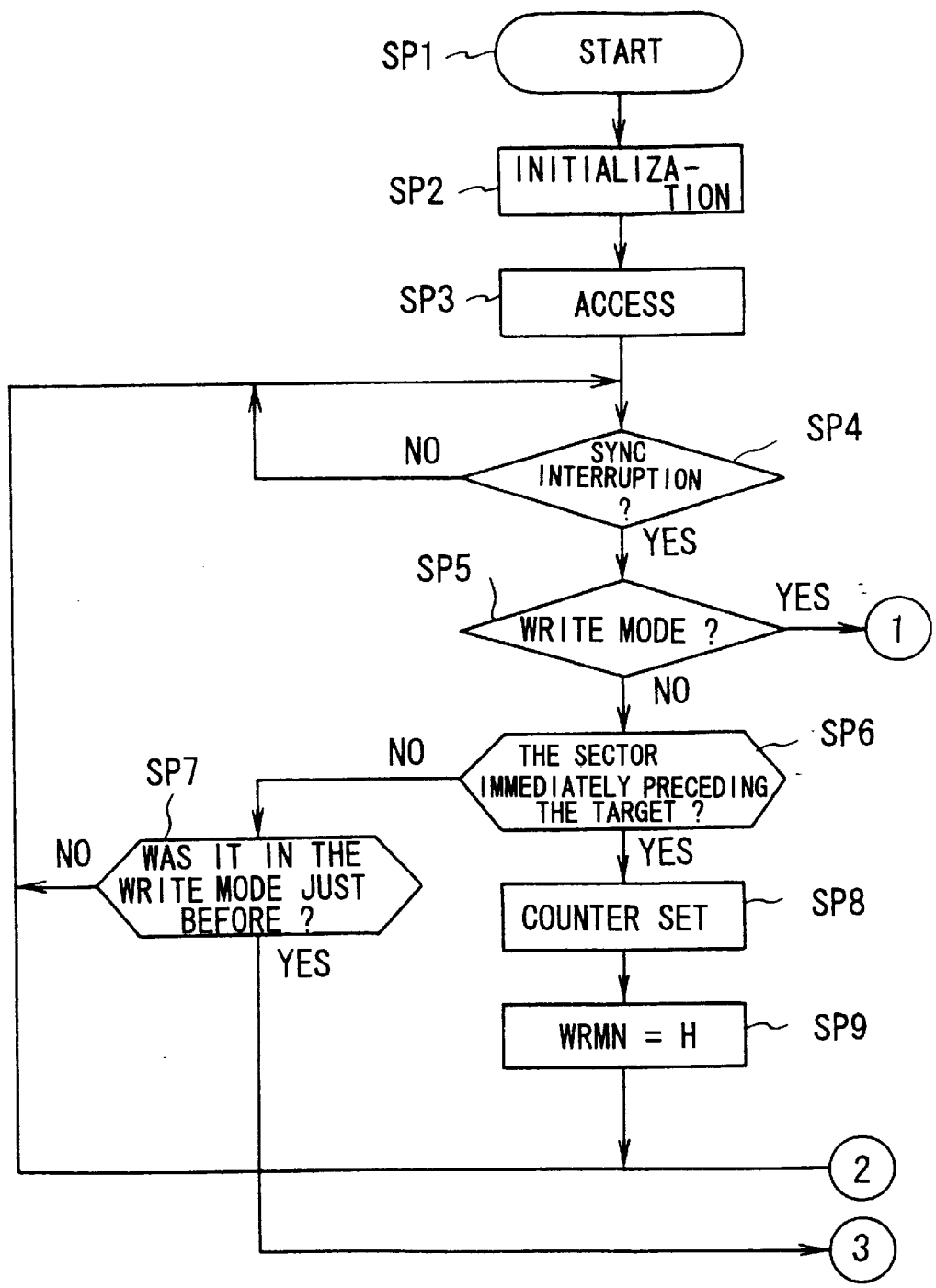
FIGS. 3 and 4 are flow charts for the explanation of the conventional procedure.
Figure 4:
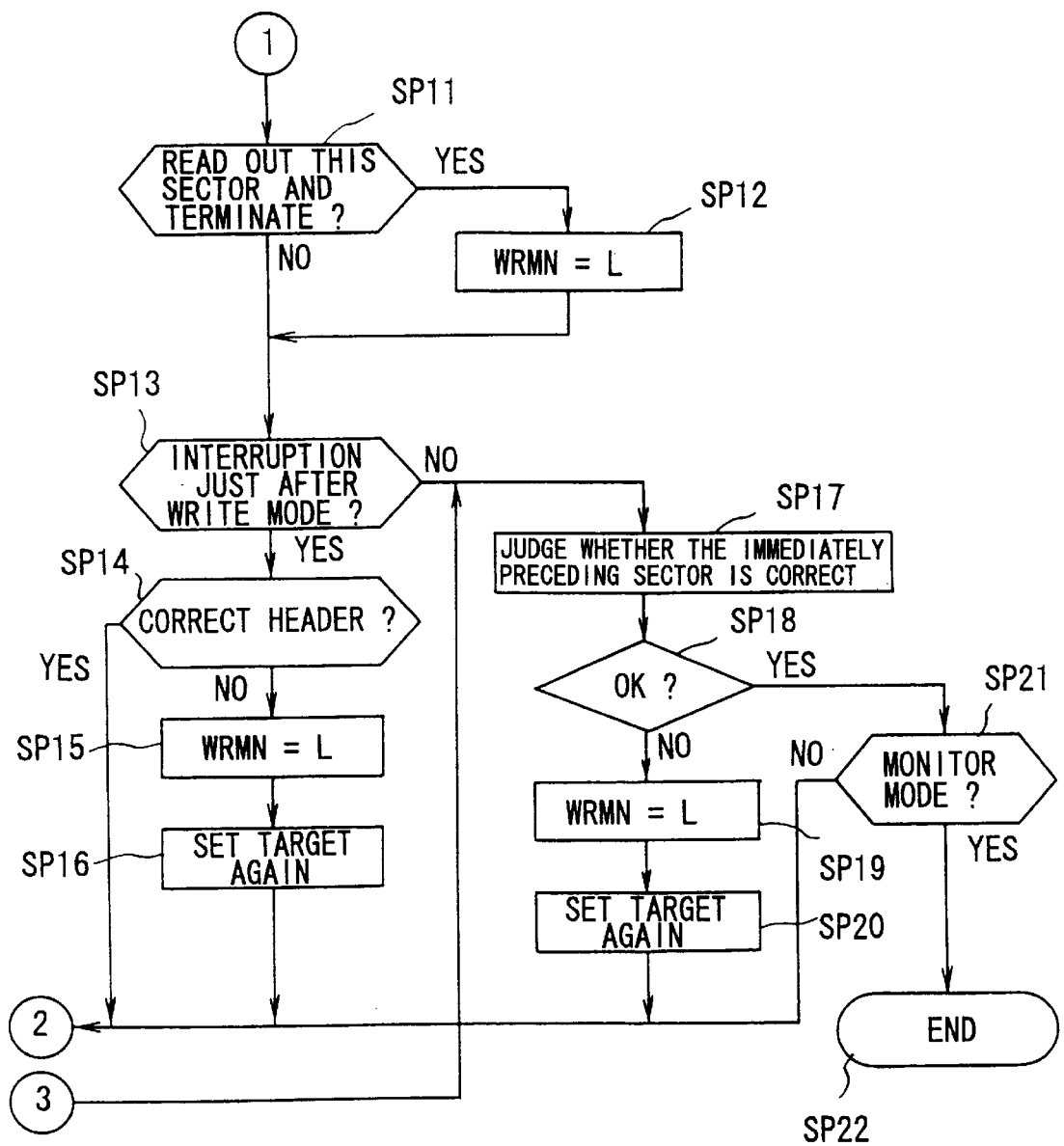

In this embodiment, the RAM control circuit 8 is constituted as shown in FIG. 3.

The RAM control circuit 8 inputs the reproducing data $D_{IN}$ into the decoder 21 consisting of a CD-ROM decoder. From the decoder 21, the decoded decode data is transferred to a RAM interface 23 via a buffer memory for writing 22.

The RAM interface 23 inputs/outputs the decoded data to/from the RAM 10 based on the RAM address and writes them to the predetermined address, and also reads and outputs them to a reading buffer memory 24. The RAM control circuit 8 outputs the read data to the data expansion circuit 11 via the interface 25 for an integrated circuit (IC) for data expansion.

Here, the RAM address given to the RAM 10 is the address for writing (for read out) or the address for reading (for reproduction) selected by a selector 26. Each RAM address is respectively generated by a read out address generating circuit 27 and a reproducing address generating circuit 28.

A decoder 21 Judges whether the processed data is link sector, sub-data, or compressed data, and provides them to a counter mode control circuit 29 as the status information.

The counter mode control circuit 29 selects the mode (straight, round, and re-try) according to the status information or the input data from the micro computer interface 30, and generates the RAM address by the sync input provided by the decoder 21.

For example, it can be arranged that when the status information is the link sector or the sub-data, the round mode is selected, and when the status information is the compressed data, the straight mode is selected.

Figure 8:
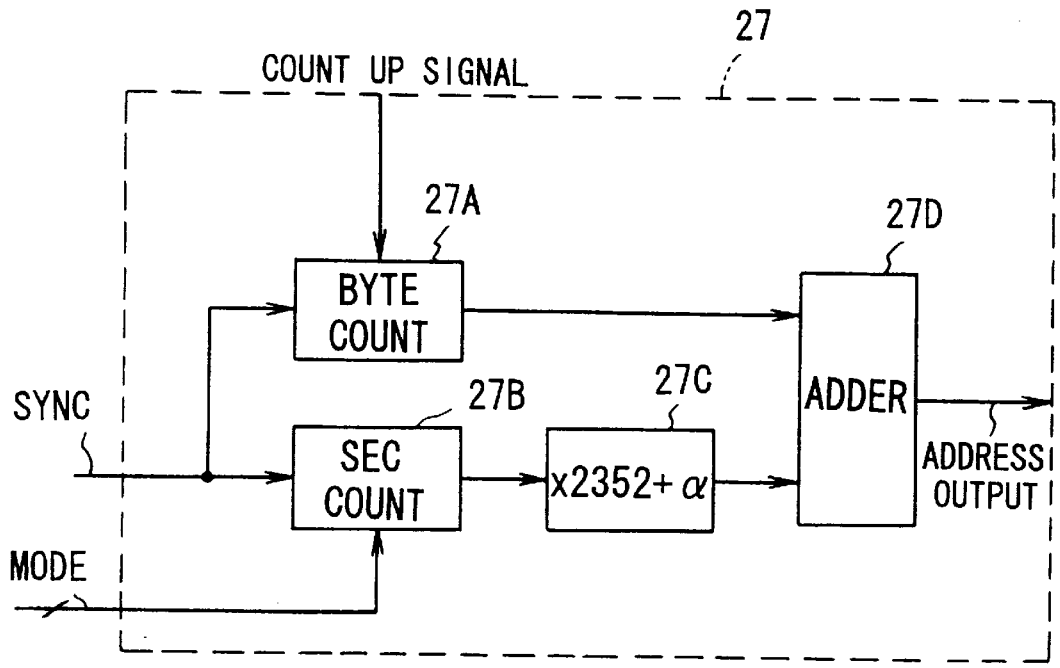
FIG. 8 is a block diagram for the explanation of a read out address generating circuit within the random access memory control circuit.
Figure 9:
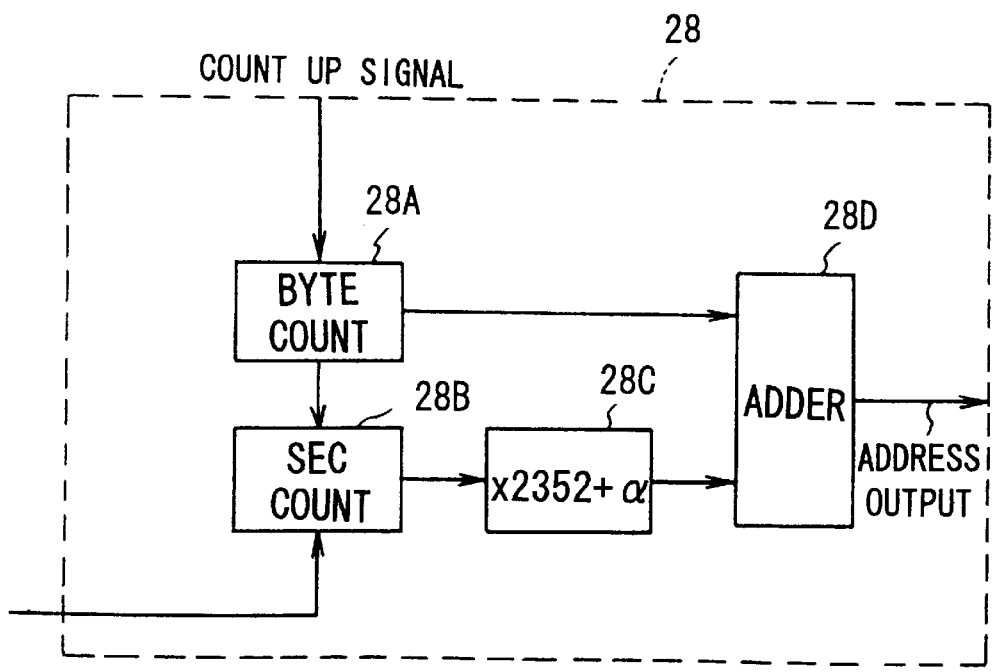
FIG. 9 is a block diagram for the explanation of a reproducing address generating circuit within the random access memory control circuit.

The read out address generating circuit 27 and the reproducing address generating circuit 28 are constituted as shown in FIGS. 8 and 9.

Here, the read out address generating circuit 27 multiplies the count value of sector counted at a sector counter 27B by 2352 (which is byte number of 1 sector) in a multiplication circuit 27C, and then adds a count value of a byte counter 27A to the absolute address which is the address of offset a added to the multiplied value. Thereafter, the added value is outputted from the adder 27D as the RAM address.

The byte counter 27A is a counter counting the access position in the sector and counts up the count value based on the count up signals inputted from the RAM interface 23. Further, the count value of the byte counter 27A is reset to "0" by sync input, so that the relative address 0 to 2351 are generated.

On the contrary, the sector counter 27B is a round counter counting the area position that the target sector to be read out is to be stored. The sector counter 27B, in the case where the present mode provided by the mode input is the straight mode, counts up the count value by one at the input of sync. And, in the case of the round mode, the count value is kept to the present value at input of sync, and in the case of the re-try mode, the count value is counted down by one at the input of sync.

Therefore, this sector counter 27B is usually in the round mode when neither the straight mode nor the re-try mode is specified by the mode input. Thus, the read out address generating circuit 27 continuously and repeatedly sets the address in the same area.

Further, the reproducing address generating circuit 28 has the same construction with the read out address generating circuit 28 as shown in FIG. 9, and there are the differences between these circuits in which the mode is only the straight mode and the sector count is sequentially counted up based on the decode value of the byte counter and the count up signals.

In this way, the RAM control circuit 8 only needs to instruct the switch of mode which is read out by the address generating circuit 27 via a micro computer interface 30 so as to easily generate the RAM address. Therefore, even when the data of a desired sector can not be read out, a new data can be easily read out to the same address.

In the above construction, the magneto optical disc reproducing apparatus 1, when it starts to read the stored data from the magneto optical disc 3, reads the reproducing data based on the remaining data of the RAM 10 according to the control of the system controller 9. At this time, the magneto optical disc reproducing apparatus 1 reads the reproducing data at the transfer rate of 1.4 [Mbit/s], inputs them to the decoder 7, and performs the demodulating process (parity elimination and deinterleave processing) for error correction and the EFM (8–14 modulation) signals demodulating process, etc.

Thereafter, the optical disc reproducing apparatus 1 once writes the reproducing data to the RAM 10 via the RAM interface 23, so that the data several seconds ahead from the audio data which is presently reproduced is stored.

Figure 10:
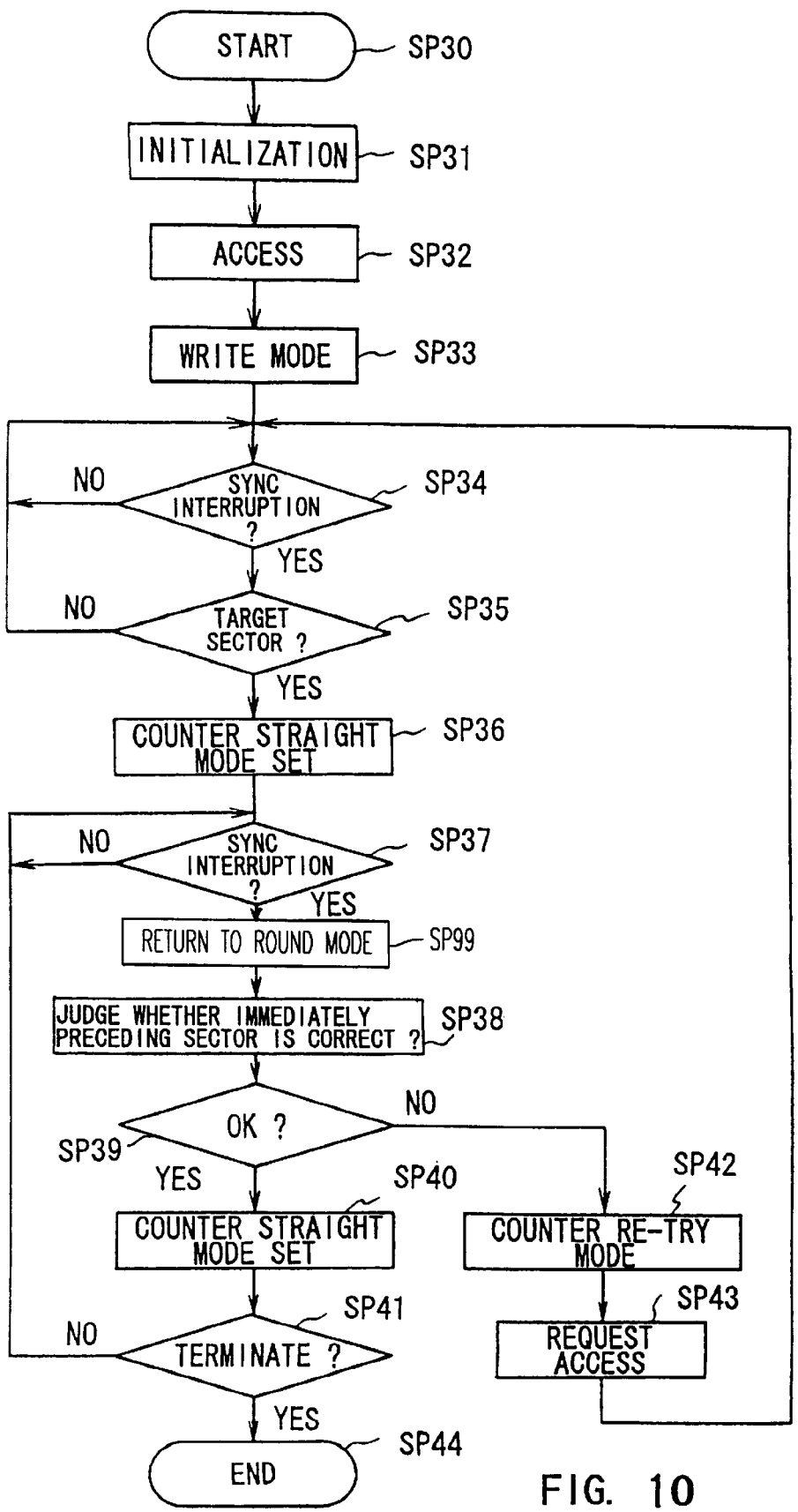
FIG. 10 is a flow chart for the explanation of the procedure thereof.

At this time, the system controller 9 generates the address of RAM 10 according to the procedure shown in FIG. 10.

The CPU which is the system controller 9 outputs the initialization command to the read out address generating circuit 27 and the reproducing address generating circuit 28 when it starts the process described above from step SP30, and initializes the count value (step SP31).

At this time, the count value of the byte counter 27A and the sector counter 27B which is built in the read out address generating circuit 27 is initially set to "0".

The CPU starts the access to the desired sector when it progresses to the following step SP32, and controls the RAM control circuit 8 to the write mode (the round mode) in step SP33.

Next, the CPU counts up the count value of the byte counter 27A and sequentially transfers the header, the subheader, the main data, and the sync in the first area AR1 (the relative address "0" to "2351").

In this state, the CPU observes the sync interrupt showing the start of sector data, sequentially counts up the count value of the byte counter 27A until the interruption occurs, and writes the sector data to the generated RAM address (step SP34).

On the contrary, when the sync interrupt occurs (that is, a positive result is obtained in step SP34), the CPU starts to read the header data of the sector inputted synchronizing to the sync (step SP35).

At this time, the count value of the byte counter 27A generating the RAM address is set to "0" by the sync input. Further, because the count value of the sector counter 27B is kept to "0" (the round mode), the RAM control circuit 8 specifies the same first area AR1 (the relative address "0" to "2351") again as data write (FIG. 12A).

Therefore, in the case where a negative result is obtained in step SP35 (that is, the sector being written at present is not the target sector), the CPU returns to the repeat step SP34 and re-writes the new sector data in the same area repeatedly, and waits for the target data to be read out.

On the contrary, when a positive result is obtained, the CPU progresses to the next step SP36 and controls the write mode to the straight mode so as to write the sector following the sector presently written in the first area AR1 into the neighboring second area AR2.

In this way, when the sync of next sector is detected, the count value of the sector counter 27B is counted up by one, and the address outputted from the adder 27D is shifted to the value having the offset of 2352 byte from the address of previous cycle.

Therefore, when the CPU confirms the sync interrupt in step SP37, the following header, subheader, . . . from the sync is written sequentially to the second area (2352 to 4704). Thereafter, at step SP99, the write mode is returned to the round mode.

The CPU progresses to following step SP38, and transfers the sector data to the second area AR2, while the CPU confirms whether the data of sector written in the first area AR1 is correct or not at the time of point b (FIG. 12B).

Here, in the case where the read out error is not detected (that is, in the case where a positive result is obtained), after the CPU proceeds from step SP39 to step SP40, it sets the write mode to the straight mode and progresses to step SP41.

Then, the CPU judges whether the termination of data read out is instructed in step SP41 or not, and if the termination is not instructed, the CPU returns to step SP37 and writes the following inputted sector to the third area AR3 which is 2352 bytes upper from the second area AR2 that the present sector is written. And after this, the CPU operates similarly.

On the contrary, in a series of writing operation, if an error is detected in the preceding sector, the CPU needs to re-write the data stored erroneously to the correct data, thus moves from step SP39 to step SP42, controls the write mode to the re-try mode, and returns to step SP34 after requesting the access to the sector which the error has been detected (step SP43).

For example, when the data is written to the second area AR2, if an error is detected in the data written in the first area AR1, the count value of the sector counter 27B is counted down by one from "1" and becomes "0".

In this way, the address specified by the read out address generating circuit 27 becomes the first area AR1 which is the immediately preceding area, and the address value outputted from the RAM control circuit 8 returns from "4704" (P3) to "0" (P0).

The CPU repeatedly over-writes the inputted data in the first area until the target sector is inputted, and switches the write mode to the straight mode when the target sector is detected (step SP34, step SP35, and step SP36).

After this, the CPU repeats the same operation, and moves to step SP44 when a positive result is obtained in step SP41 and terminates the whole processing.

The series of state transitions by the CPU is shown in FIG. 11.

Figure 7:
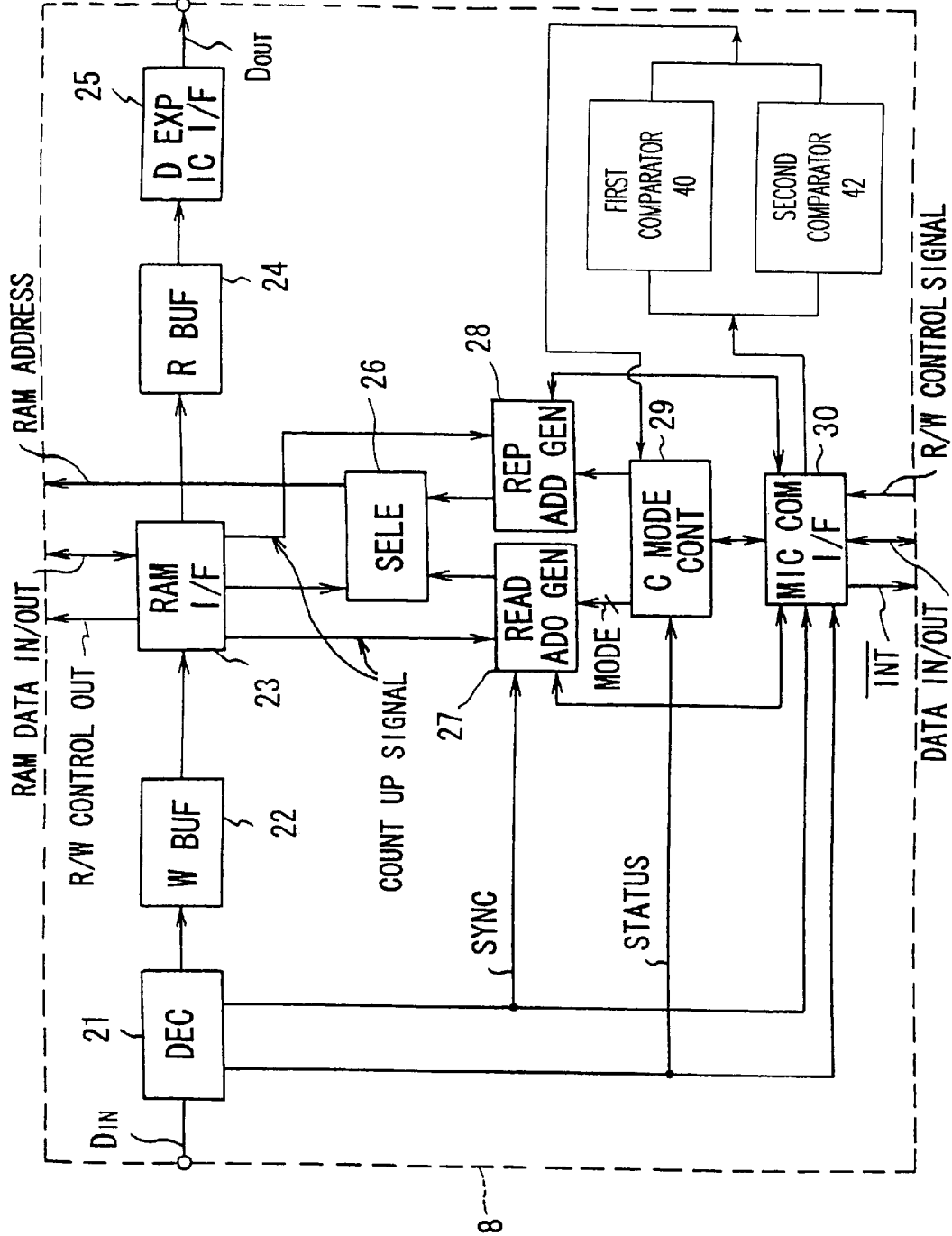
FIG. 7 is a block diagram showing the constitution of a random access memory control circuit.

That is, except when waiting for the detection of the target sector, during access operation, or when the write is prohibited, the CPU is positioned in the round mode, and when there is a blank area in the RAM 10 (that is, the written data size is less than a first predetermined value as determined by first comparator 40 of FIG. 7); and when the header of desired sector is detected, the CPU moves from the round mode to the straight mode.

The CPU that has changed to the straight mode repeats this straight mode while the read out of the previous sector data is valid at the time of the data read out to the next area. When the read out of the data to the previous area is invalid or there is no blank area in the RAM 10 (that is, the data size is more than the second predetermined value as determined by second comparator 42 of FIG. 7). The CPU moves temporarily to the re-try mode or the round mode.

In this way, if the CPU does not make a mistake in the first starting point from the round mode to the straight mode, the CPU can transfer the data to the predetermined address by performing the judgement once whether the read out of the immediately preceding sector is valid or not for each sector. Hence, it is not necessary to perform three confirmations of the write state for each sector as in the conventional process, thereby alleviates the load of the CPU.

With the above construction, the internal address of the RAM 10 is generated by using two counters, the byte counter 27A for generating the byte address within one sector and the sector counter 27B for specifying the recording area of sector units. The area is specified by the sector counter 27B which switches among three modes, the straight mode for specifying the area following the present area, the round mode for specifying the present area repeatedly, and the re-try mode for specifying the preceding area, so that it is simplifies the specification of address significantly in comparison with the conventional construction.

The embodiment discussed above has dealt with the case where sound data compressed to ⅕ is reproduced from the magneto-optical disc. However, the present invention is not limited to this but the compression factor may be other values, and the present invention is widely applicable to the case where the sound data without compression is read.

Further, the embodiments discussed above have dealt with the case where the compressed sound data is reproduced from the magneto-optical disc. However, the present invention is not limited to this, but is widely applicable to the case where the compressed sound data is reproduced from the optical disc.

Figure 1:
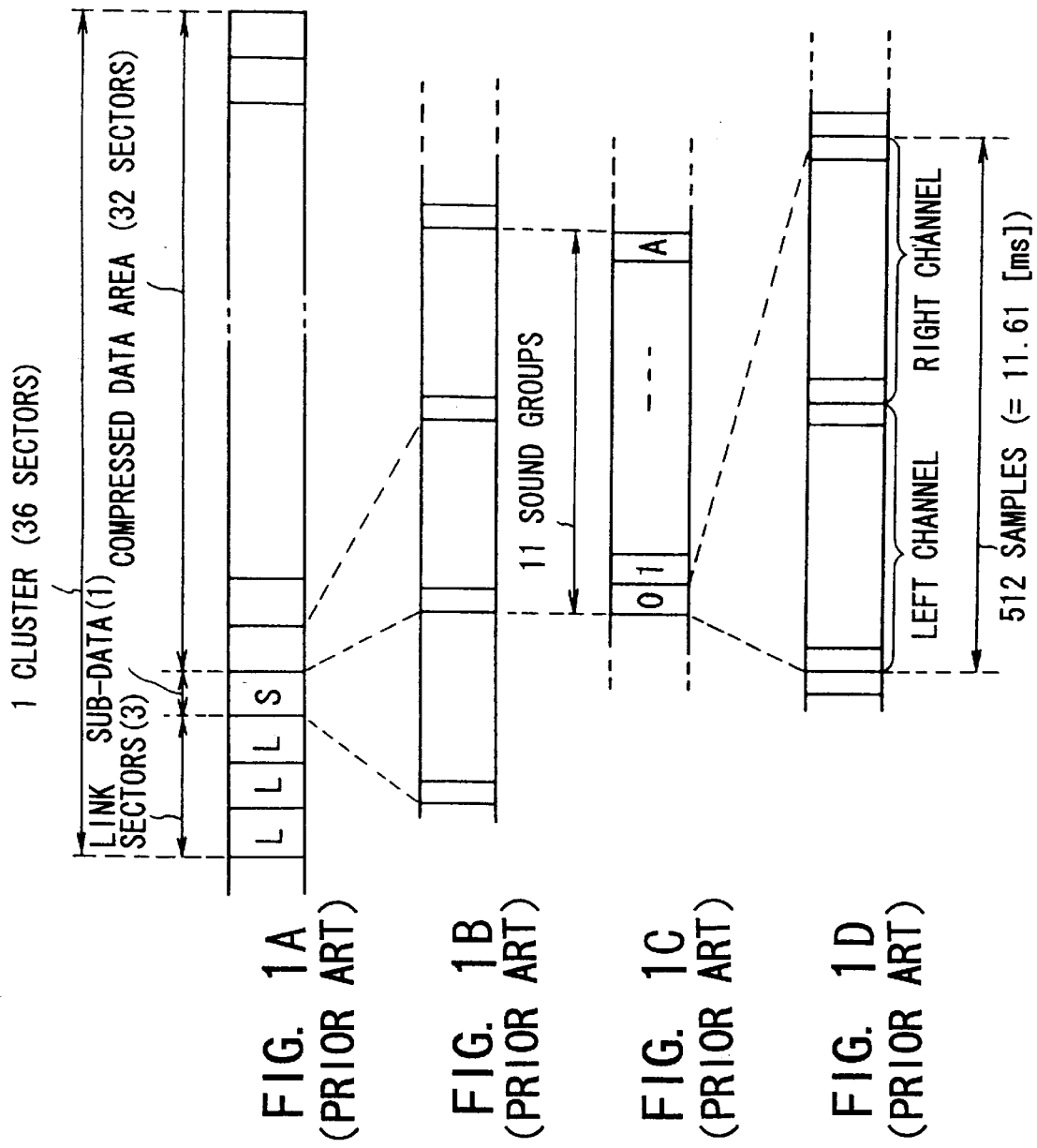
FIGS. 1A to 1D are schematic views showing the data structure of a cluster.
Figure 2:
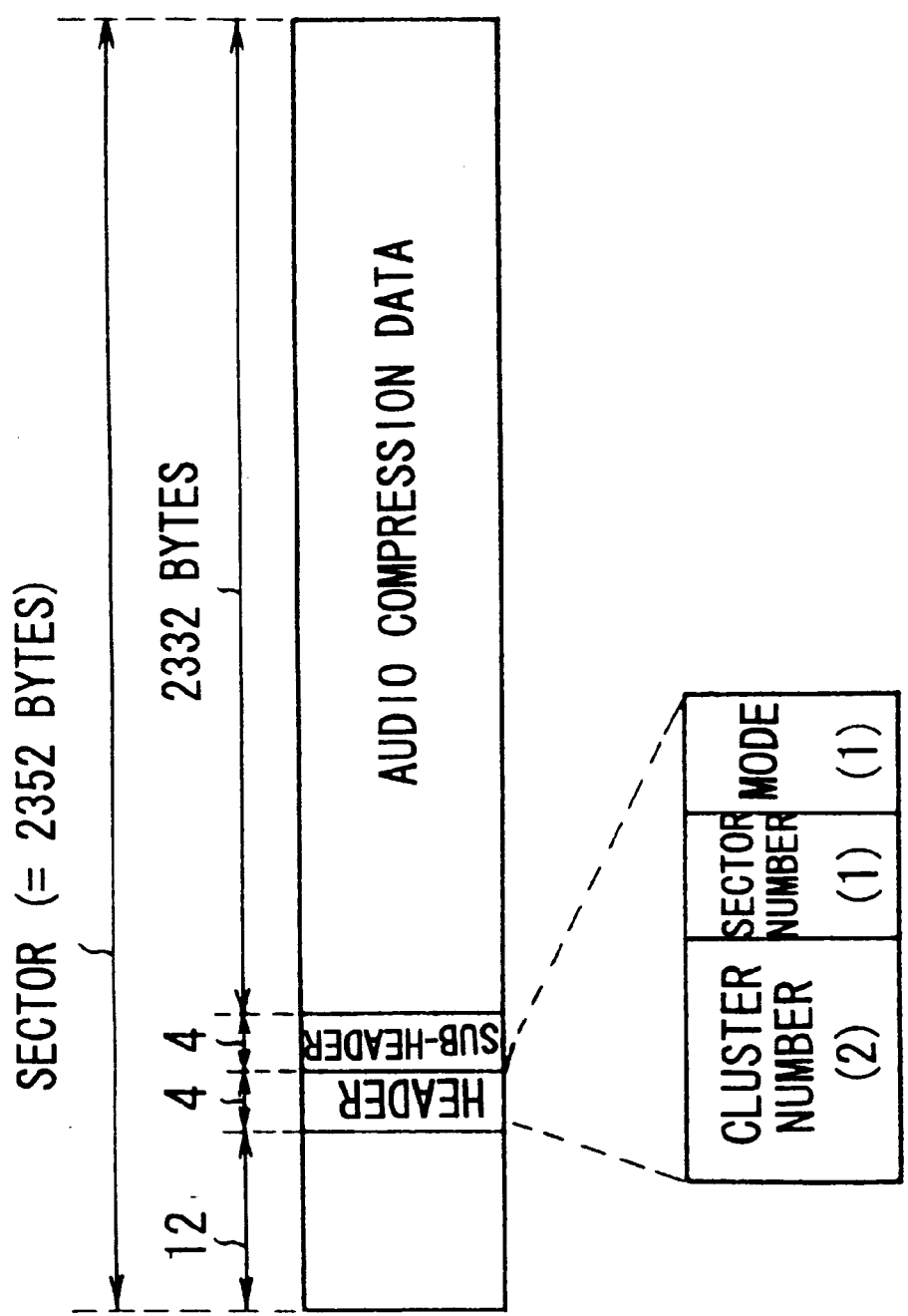
FIGS. 2A and 2B are schematic views showing the data structure of a sector.

Further, the embodiments discussed above have dealt with the case where the write mode (straight mode, round mode, and re-try mode) are switched by the read/write control signals. However, the present invention is not limited to this, but the mode control data may be written in the sub-data area (FIG. 1A) for recording the control data or the characteristic information of cluster units, and the write mode can be controlled for every cluster based on this control data, and further the write mode can be controlled based on the error flag for each data.

Also, the internal address of the RAM 10 may be generated based on both of the control data added to the reproduction data to be read to the RAM 10 and the read/write control signal provided from the system controller 9.

Further, the embodiments discussed above have dealt with the case where, if an error is detected in the recorded sector in the immediately preceding recording area and the reproduction data is in need of reading out again, in the re-try mode, the sector data is over-written in the recording area where an error is detected. However, the present invention is not limited to this, but, in the round mode, the sector data which has the error in the recording area being presently written may be over-written, and after this, the above process may be repeated.

For example, in the case where an error is detected in the sector data recorded in the first area AR1 when the present sector data is written in the second area AR2, the read out is started from the data in the second area. At this time, the data in the same sector is taken in the first area AR1 and the second area AR2. In this case, it is judged which data has higher quality, so that an error flag may be set to the data having lower quality to have it ignored in reproduction.

Furthermore, the above embodiments have dealt with the case where, in the re-try mode, the area returns to the immediately preceding area for the area that the data is writing at present. However, the present invention is not limited to this, but the area may return to an area preceding a plurality of sectors.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A disc reproducing apparatus in which after a sector consisting of sync data, header data, and digital data, and data stored in a recording medium is sequentially read for the sector and is written in a memory, the data stored in the memory is sequentially read and is reproduced, comprising:

a memory controller which controls writing of data to the memory and reading of the data stored in the memory, wherein the memory controller comprises:

a write address generator which generates a write address corresponding to a location in the memory in response to a mode signal; and a counter mode controller which generates the mode signal to control the write address generator and switches a data reading and writing mode according to a control signal, wherein the modes for which the counter mode controller generates mode signals include a round mode in which the internal address of the memory generated by the write address generator corresponds to a same memory area as a currently specified memory area, a straight mode in which the internal address of the memory generated by the write address generator corresponds to a memory area after the currently specified area, and a retry mode in which the internal address of the memory generated by the write address generator corresponds to a memory area previous to the currently specified area, the generated address including an address corresponding to a memory area not immediately previous to the currently specified area; and a controller which controls the operation of the memory controller by generating a control signal which controls the operation of the counter mode controller.

2. The disc reproducing apparatus of claim 1, wherein the controller further comprises:

a first comparator for comparing the data size stored in the memory with a first predetermined value; and a second comparator for comparing the data size stored in the memory with a second predetermined value smaller than the first predetermined value, wherein when the write address generator is in the straight mode, and the data size stored in the memory is more than the first predetermined value, the mode is switched to the round mode, and when the write address generator is in the round mode and the data size stored in the memory is less than the second predetermined value, the mode is switched to the straight mode.

3. The disc reproducing apparatus of claim 1, wherein the controller switches to the re-try mode when the write address generator is in the straight mode and an error is detected in the data written to the memory.

4. The disc reproducing apparatus of claim 1, wherein the sector data type is either link sector data or compression data, and further, wherein the counter mode controller selects the round mode when the sector data is link sector data and selects the straight mode when the sector data is compression data.

5. The disc reproducing apparatus of claim 1, wherein the sector data type is sub-data or compression data, and further, wherein the counter mode controller selects the round mode when the sector data is sub-data and selects the straight mode when the sector data is compression data.

6. A memory control circuit for controlling a memory in which after stored data is sequentially read from a recording medium for a sector unit including sync data, header data, and digital data, and is written in a memory, the data stored in the memory is sequentially read for each sector, comprising:

a) a signal processor which extracts the sync data of the sector and determines a status of the sector;

b) a counter mode controller which controls a mode according to data from a controller and the status of the sector;

c) a read out address generator which generates a read out address corresponding to a location in the memory according to the mode specified by the counter mode controller and the sync data from the signal processor; and d) a controller which controls writing of data to the memory and reading of data from the memory according to the memory address specified by the read out address generator;

wherein the modes for which the counter mode controller generates mode signals include:

1) a round mode in which the internal address of the memory generated by the write address generator corresponds to a same memory area as a currently specified memory area;

2) a straight mode in which the internal address of the memory generated by the write address generator corresponds to a next memory area after the currently specified area; and 3) a re-try mode in which the internal address of the memory generated by the write address generator corresponds to a memory area previous to the currently specified area, the generated address including an address corresponding to a memory area not immediately previous to the currently specified area; and wherein the write address generator further includes:

i) a sector counter for counting a sector number of data inputted with sector unit, wherein the data is divided into sectors having a sector number with each sector containing a predetermined amount of data;

ii) a calculator for converting the value counted by the sector counter from a sector number to a byte number;

iii) a byte counter for counting the added result for each byte according to a count up signal from the memory controller; and iv) an adder for adding the result of the calculator and the result of the byte counter.

7. The memory control circuit of claim 6, wherein the byte counter further comprises:

a resetter for resetting the byte counter to "0" by input of the sync data.

8. The memory control circuit of claim 6, wherein the sector counter counts according to the mode input.

9. The memory control circuit of claim 6, wherein the sector counter maintains the present counter value in the round mode, counts up the counter value in the straight mode, and counts down the counter value in the re-try mode.

10. A memory control method for controlling a memory, in which after data is sequentially read out from a recording medium for a sector unit including sync data, header-data, and digital data, and is stored in the memory, the data stored in the memory is sequentially read out for the sector unit and written, comprising the steps of:

initializing an address of an address generating circuit;

setting a memory controller to a round mode;

determining that sync data has been generated;

determining whether the generated sync data corresponds to a target sector;

setting the memory controller to a straight mode when the sync data corresponds to the target sector;

determining whether sector data previously written is correct; and setting the memory controller to a retry mode when the sector data previously written is not correct.

11. The memory control method of claim 10, further comprising the steps of:

setting the memory controller to a straight mode when the sector data previously written is correct;

determining whether the data read out process is complete; and over-writing new sector data in the same area repeatedly when the sync data does not correspond to the target sector when the sync data is generated.

12. A disc reproducing apparatus in which after a sector consisting of sync data, header data, and digital data, and data stored in a recording medium is sequentially read for the sector and is written in a memory, the data stored in the memory is sequentially read and is reproduced, comprising:

a memory controller which controls writing of data to the memory and reading of the data stored in the memory, wherein the memory controller comprises:

a write address generator which generates a write address corresponding to a location in the memory in response to a mode signal; and a counter mode controller which generates the mode signal to control the write address generator and switches a data reading and writing mode according to a control signal, wherein the modes for which the counter mode controller generates mode signals include a round mode in which the internal address of the memory generated by the write address generator corresponds to a same memory area as a currently specified memory area, a straight mode in which the internal address of the memory generated by the write address generator corresponds to a memory area after the currently specified area, and a re-try mode in which the internal address of the memory generated by the write address generator corresponds to a memory area previous to the currently specified area, the generated address including an address corresponding to a memory area not contiguous to the currently specified area; and a controller which controls the operation of the memory controller by generating a control signal which controls the operation of the counter mode controller.

* * * * *

UNITED STATES PATENT AND TRADEMARK OFFICE
CERTIFICATE OF CORRECTION

PATENT NO. : 6,272,084 B1
DATED : August 7, 2001
INVENTOR(S) : Yasuaki Maeda

It is certified that error appears in the above-identified patent and that said Letters Patent is hereby corrected as shown below:

Column 1,
Line 30, delete "tark" and insert -- track --.
Line 49, delete "tark" and insert -- track --.

Column 6,
Line 23, delete "Judges" and insert -- judges --.
Line 42, delete "a" and insert -- α --.

Column 9,
Line 3, delete ". The" and insert -- , the --.

Signed and Sealed this

Fifteenth Day of October, 2002

Attest:

JAMES E. ROGAN
Attesting Officer     Director of the United States Patent and Trademark Office